W. G. BROMLEY.
ADJUSTABLE CORN HUSKING TABLE.
APPLICATION FILED JAN. 20, 1919.
1,307,956.
Patented June 24, 1919.
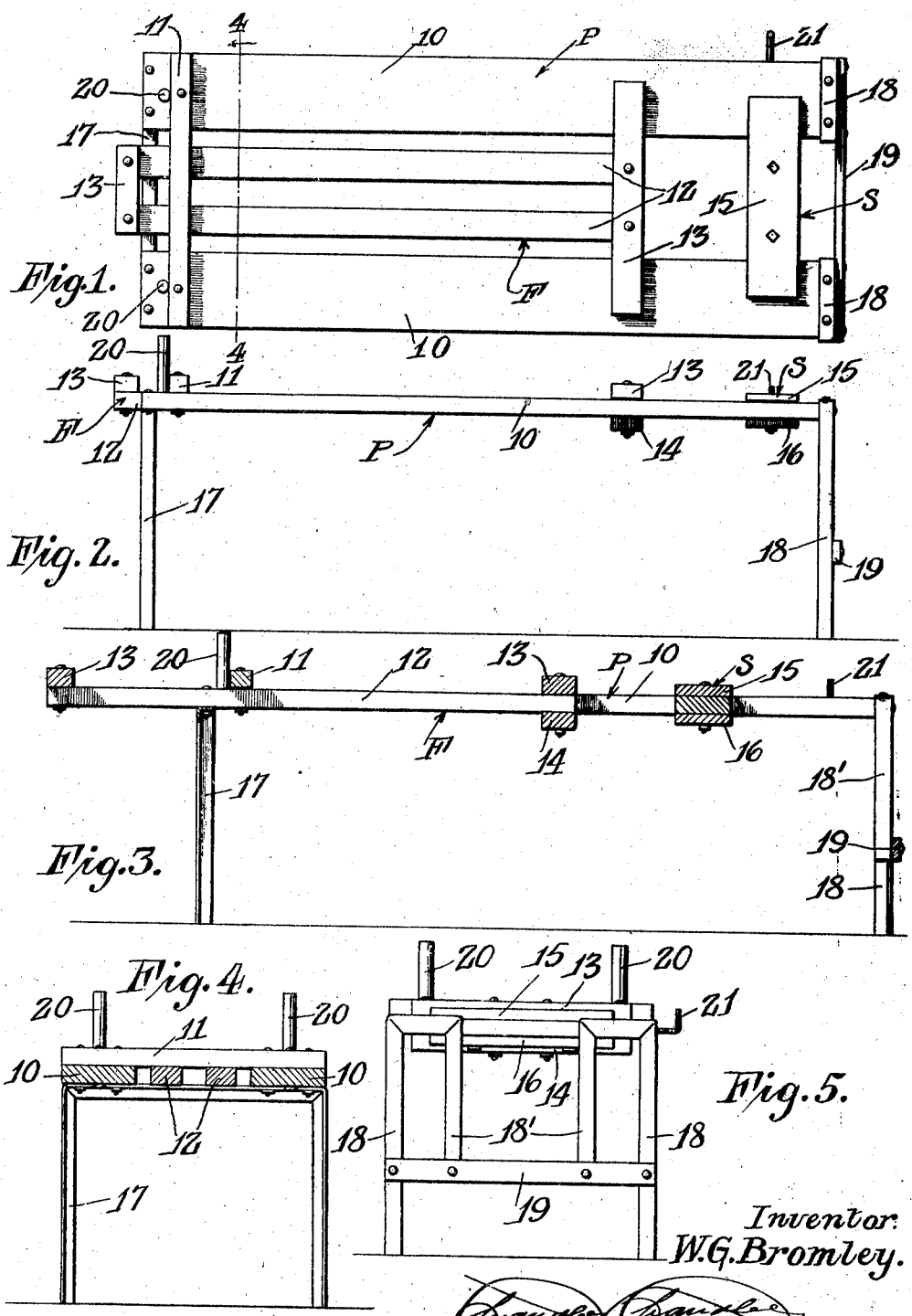
Inventor:
W. G. Bromley.
By 
Attorneys

UNITED STATES PATENT OFFICE.

WILLIAM G. BROMLEY, OF MERCER, PENNSYLVANIA.

ADJUSTABLE CORN-HUSKING TABLE.

1,307,956.  Specification of Letters Patent.  Patented June 24, 1919.

Application filed January 20, 1919. Serial No. 272,077.

*To all whom it may concern:*

Be it known that I, WILLIAM G. BROMLEY, a citizen of the United States, residing at Mercer, in the county of Mercer, State of Pennsylvania, have invented certain new and useful Improvements in Adjustable Corn-Husking Tables; and I do hereby declare the following to be a full, clear, and exact description of the invention, such as will enable others skilled in the art to which it appertains to make and use the same.

This invention relates to corn husking devices and more particularly to an adjustable corn husking table adapted to be used in and to facilitate the husking of corn by hand.

The invention comprehends an improved adjustable corn husking table adapted to receive the shocks of corn across the same so that the corn stalks will not be broken and so that the operator can move along the table to adjust himself to the position of the stalks as the latter are being husked, thereby obviating the necessity of continually bending over in husking corn in the usual way, in the field, and also greatly relieving the farmer or person carrying out the husking operation, from kneeling down on the ground and from getting sore knees or sore back and otherwise being incapacitated for work.

A further object of the invention consists in providing an improved corn husking table embodying a platform suitably supported as upon corner legs, while the platform is open longitudinally and receives therein a sliding frame adapted to be moved along the platform as the corn is husked and the stalks thereof bundled and tied, and thrown aside and to support the short lengths of stalks as well as to prevent the same from dropping through the table on to the ground or becoming broken, while arranged to move along the platform is a seat for the person carrying out the husking operation, so as to follow up the supply until exhausted.

With the above objects and others in view, as will appear as the specification proceeds, the invention comprises certain novel combinations and arrangements of parts, as will be hereinafter more particularly described, set forth in detail and claimed.

Reference is had to the accompanying drawings forming a part of this application, wherein like reference characters designate similar parts throughout the several views, and wherein—

Figure 1 is a plan view of my improved adjustable corn husking table;

Fig. 2 is a side elevation thereof;

Fig. 3 is a longitudinal sectional view showing the adjustable slide slightly extended as in the husking operation;

Fig. 4 is a transverse sectional view taken on the line 4—4 of Fig. 1, and

Fig. 5 is an end elevation of the device.

Referring to the drawings in detail, my improved adjustable corn husking table is shown as comprising a platform generally designated by the reference character P, the same including spaced longitudinally arranged and parallel side bars 10 connected adjacent one end of the platform by an end strip 11 serving to rigidly brace the platform and hold the side bars in the relation specified.

Movably supported by the side bars of the platform is an adjustable frame F comprising spaced longitudinal frame members or bars 12 also disposed in spaced parallel relation with respect to each other and to the side bars 10. These bars 12 are connected at their outer ends by a top cross strip 13 and at their inner ends by top and bottom strips 13 and 14 arranged transversely at right angles thereto and providing grooves between the same at their ends for slidably fitting the inner edges of the side bars so that the adjustable frame will be effectively supported in any position of its movement along the platform of the table. It should also be noted, as will be clearly apparent from an inspection of the drawings, that the bottom strip 14 of the transverse or cross members of the adjustable or sliding frame, is of the same length as the top strip 13 at the same end so as to facilitate the application and removal of the frame. It should also be noted that the upper strip 14 sustains the weight of the frame in conjunction with a support or end frame 17, while the lower strip 13 beneath the strip 14 and the opposite end strip 11 prevent upward displacement thereof.

Also arranged to move along the platform in rear of the frame is a seat generally designated by the letter S, said seat comprising top and bottom plates 15 and 16 suitably connected intermediately with the ends thereof spaced apart to provide grooves for receiving the inner edges of the side bars in a like manner that the adjacent members 13 and 14 of the sliding frame receive said edges. In this way, the seat is retained in position and as the operator reposes thereon, the seat may be moved along the platform or rails thereof produced by the side bars 10, by stepping along the ground while the operator is in a seated position, the same as in walking as the frame F bearing the corn is moved along the platform P.

In order to support the platform in spaced relation above the ground, there is provided at one end of the table, a U-shaped support 17 constructed of angle-iron or steel to produce end frames and legs which are bolted or otherwise secured to the side bars 10, as particularly shown in Fig. 4 of the drawings. At the opposite end of the table, the side bars 10 have secured thereto, an end frame comprising corner legs 18 with horizontal upper portions bolted or otherwise secured to the side bars, as shown in Fig. 1. These legs like the U-shaped member producing the legs 17, are of angle-iron or steel, and at the lower extremities of the inner portions 19' thereof are connected by a horizontal member or brace 19. This leaves the center of the frame open and facilitates access to and from the seat S.

It should also be noted that the transverse or end frames are located at the extreme ends of the side bars, while the strip 11 is spaced from said end frame 17 so that the side bars project beyond the strip 11 without interfering with the complete inward displacement of the adjustable or sliding frame in telescopic relation to the platform, when the device is in its original or receiving position. Also arranged on the side bars 10 beyond the strip 11, are upright stakes 20 which serve to prevent displacement of the corn stalks as the sliding frame is adjusted along the platform of the table.

In the use of the device, the shocks of corn to be husked, are laid transversely across the platform and frame, preferably two shocks at a time and then spread out on the table between the strip 11 and stakes 20, and the cross member 13 at the seat end of the sliding frame. The operator then sits on the seat between the side bars and carries out the husking operation, advancing or moving the frame along the platform and following up the same on the seat so that the corn stalks are always in convenient reach without the objectionable features pointed out. For convenience in tying the bundles of fodder, there is arranged at the seat end of the table, a hook 21 which is carried by the adjacent transverse bar 11, upon which may be suspended the cord or ties for tying up the bundles and tossing them to the rear. During the husking operation, the sliding frame will obviate the possibility of breaking the stalks, thereby insuring better fodder. The operator can also carry on the work with facility and without the usual objections incident to shocking in the field.

What is claimed is;

1. In a corn husking table, a platform supported in spaced relation to the ground and including spaced bars, a frame slidably supported by said bars and movable between the same, with the upper and lower faces of the bars and frame substantially in the same horizontal plane; and a seat also slidably fitting the side bars to move along the platform in rear of the frame whereby to be maintained in close proximity thereto at all times.

2. A corn husking apparatus comprising a platform, an end frame supporting said platform, one of said end frames being open centrally and said platform having side bars spaced apart to provide an unobstructed opening extending substantially throughout the length of the platform and communicating with the opening in the end frame, a frame disposed in the opening between the side bars and supported for movement by the end frame opposite the open end frame and by said side bars; means for retaining the corn stalks on the platform and movable frame between the end of the platform remote from the open frame and the end of the movable frame adjacent the open frame, and a seat supported by and between the side bars for movement along the same whereby to be maintained in convenient relation to the movable frame and the stalks.

In testimony whereof, I affix my signature in the presence of two witnesses.

WILLIAM G. BROMLEY.

Witnesses:
CLARENCE D. PALMER,
HARRY I. KITCH.